(12) United States Patent
Deutschmann et al.

(10) Patent No.: US 11,113,371 B2
(45) Date of Patent: Sep. 7, 2021

(54) CONTINUOUS AUTHENTICATION BASED ON MOTION INPUT DATA

(71) Applicant: BehavioSec Inc, San Francisco, CA (US)

(72) Inventors: Ingo Deutschmann, Merseburg (DE); Per Burstrom, Lulea (SE); Wolfgang Pott, Weisskeissel (DE)

(73) Assignee: BEHAVIOSEC INC, San Francisco, CA (US)

( * ) Notice: Subject to any disclaimer, the term of this patent is extended or adjusted under 35 U.S.C. 154(b) by 0 days.

(21) Appl. No.: 16/599,161

(22) Filed: Oct. 11, 2019

(65) Prior Publication Data

US 2020/0074053 A1    Mar. 5, 2020

(51) Int. Cl.
| | |
|---|---|
| G06F 21/31 | (2013.01) |
| G06F 3/0488 | (2013.01) |
| G06F 21/36 | (2013.01) |
| G06F 3/02 | (2006.01) |

(52) U.S. Cl.
CPC ............. G06F 21/316 (2013.01); G06F 3/02 (2013.01); G06F 3/04886 (2013.01); G06F 21/36 (2013.01); G06F 2203/04803 (2013.01); G06F 2221/2151 (2013.01)

(58) Field of Classification Search
CPC ........ G06F 21/31; G06F 21/316; G06F 21/36; G06F 3/02; G06F 3/023; G06F 3/0488; G06F 3/04886; G06F 2203/04803; G06F 2221/2151
See application file for complete search history.

(56) References Cited

U.S. PATENT DOCUMENTS

| | | | |
|---|---|---|---|
| 8,997,191 B1* | 3/2015 | Stark | G06F 21/32 726/6 |
| 10,693,661 B1* | 6/2020 | Hamlet | H04L 9/0866 |
| 2009/0150992 A1* | 6/2009 | Kellas-Dicks | G06F 21/32 726/19 |
| 2014/0198048 A1* | 7/2014 | Unruh | G06F 3/0237 345/168 |
| 2016/0063471 A1* | 3/2016 | Kobres | G06Q 20/40145 705/18 |
| 2016/0239649 A1* | 8/2016 | Zhao | G06F 21/316 |
| 2017/0116405 A1* | 4/2017 | Samzelius | G06F 3/023 |
| 2018/0129413 A1* | 5/2018 | Berger | G06F 3/04886 |
| 2019/0073457 A1 | 3/2019 | Jiang et al. | |
| 2019/0311261 A1* | 10/2019 | Baldwin | G06N 3/08 |

* cited by examiner

*Primary Examiner* — Jung W Kim
*Assistant Examiner* — Adrian Stoica
(74) *Attorney, Agent, or Firm* — Michael J. Feigin, Esq.; Feigin and Fridman LLC

(57) ABSTRACT

Disclosed is a method for continuously authenticating a user based on motion input data. The method includes recording motion input data from a keyboard such as starting coordinates, ending coordinates, and timestamps of key-up actions to determine that a key has been pressed, recording a timestamp of motion input at the starting coordinate, mapping the timestamp of said motion input at the starting coordinate to a key-down action for the key press, determining which key of said virtual keyboard said key-down action refers to, and granting or denying access to a device if the timing of the key which was pressed and released in the key-down action and the corresponding key-up action matches the press and flight timing of a key which was pressed and released in a previously-recorded key-down action and a previously-recorded key-up action.

1 Claim, 4 Drawing Sheets

CONTINUOUS AUTHENTICATION BASED ON MOTION INPUT DATA

FIELD OF THE DISCLOSED TECHNOLOGY

The disclosed technology relates to a method of determining the identity of a user performing a function on a device. More specifically, the disclosed technology relates to a method of determining the identity of a user on a device by tracking, recording, and storing motion input data of key presses on a keyboard and comparing the same with previously recorded motion input data of the user.

BACKGROUND OF THE DISCLOSED TECHNOLOGY

The matter of digital security is an ever-more pressing concern. Passwords and other such authenticators used at the beginnings of secure digital sessions are no longer sufficient to combat the increasing attacks of hackers and malware. Continuous pauses for re-authentication, however, is an impractically laborious solution.

User authentication based on touch gestures is a promising technology for implicit continuous authentication that does not interfere with the user experience. The authentication can be performed without the end-user's knowledge, providing a security layer that guards against unauthorized use as well as malware infections.

Touch gestures are comprised of swipes, flicks, zooms and button presses, and the data of each gesture contains a set of at least two or more points, each of which may include any or all of the following: screen x and y coordinates, pressure readings, timestamps, and accelerometer and gyroscope readings. The authentication method works on the assumptions that (a) each user performs some or all of these gestures in an identifiably-unique way, allowing a user profile to be constructed based on these recorded gestures, and (b) that changing the way that one performs these gestures (in order to circumvent the authentication system) is as difficult as changing other biometrics, such as gait and speaking tone.

This field is hampered by a severe lack of data, especially regarding gestures performed on virtual keyboards. Many external applications on devices do not report key press down timings. If they do, the timings are often inaccurate. For example, a keyboard recording swipes to form a word can deliver only the last timestamp of the swiped word. Since such word forming can take a long time, this means that a lot of digitizer time sampling information is lost.

Accordingly, there is therefore a need for a method for recording accurate key timings, especially on virtual keyboards, for purposes of both initial and continuous user authentication.

SUMMARY OF THE DISCLOSED TECHNOLOGY

Disclosed herein is a method, performed in a secure computing engine of a device, of determining an identity of a user of the device, including the steps of displaying or receiving an indication of a virtual keyboard being exhibited on a touchscreen; receiving data including motion input on the touchscreen, a starting coordinate of the motion input, an ending coordinate of the motion input, and a timestamp and a key code of a key-up action; determining, based on the starting coordinate and the ending coordinate of the motion input, that a key of the virtual keyboard has been pressed; recording a timestamp of the motion input at the starting coordinate; mapping the timestamp of the motion input at the starting coordinate to a key-down action for the key press, determining, based on a comparison between the timestamp of the key-up action and the timestamp of the key-down action, and using the key code, which key of the virtual keyboard the key press refers to; and changing functionality of the device, such as granting or denying access to one or more functions of the device based, at least in part, on the timestamp of the key-down action for the key, a corresponding timestamp of the key-up action provided by the device, and comparison of timing of the key-down action and the corresponding key-up action to a previously-recorded timestamp of a previously-recorded key-down action and a previously-recorded timestamp of a previously-recorded key-up action.

In some embodiments, the comparison which leads to the changing of functionality of the device, such as granting or denying of access to the one or more functions of the device includes determining that the key which was pressed and released in the key-down action and the corresponding key-up action is the same key as a key which was pressed and released in the previously-recorded key-down action and said previously-recorded key-up action.

In some embodiments, the comparison which leads to the changing of functionality of the device, such as granting or denying of access to the functions of the device further includes a comparison of other information gathered by the device, which includes pressure readings, accelerometer readings, touch sensor readings, and gyroscope readings.

In embodiments, the device includes an operating system kernel and a secure behavioral module, in which the data including the timestamp of the key-up action is recorded in the operating system kernel and then transmitted to the secure behavioral module. In some embodiments, the data including the starting coordinate of the motion input and the ending coordinate of the motion input is stored in the secure behavioral module. In one embodiment, the mapping occurs in the secure behavioral module. In another embodiment, the comparisons of the timing of the key-down action and the corresponding key-up action to the previously-recorded timestamp of the previously-recorded key-down action and the previously-recorded timestamp of the previously-recorded key-up action timing occur in the secure behavioral module. In an alternative embodiment, the changing of functionality of the device, such as granting or denying of access to one or more functions of the device is determined and executed from within said secure behavioral module.

In some embodiments, the device comprises an operating system kernel and a secure behavioral module, in which the data including the timestamp of the key-up action is anonymized before being transmitted to the secure behavioral module and the anonymizing is performed as a result of a policy decision in the secure behavioral module.

In one embodiment, the previously recorded key-down action and the previously recorded key-up action timing is based on data from a second device.

In embodiments, the second device includes an operating system kernel and a secure behavioral module. In one embodiment, the data including the timestamp of the key-up action is recorded in the operating system kernel and then transmitted to the secure behavioral module. In another embodiment, the data including the starting coordinate of the motion and the ending coordinate of the motion input is stored in the secure behavioral module. In yet another embodiment, the mapping occurs in the secure behavioral module.

In some embodiments, the second device including an operating system kernel, in which the data including the timestamp of the key-up action and the data including the timestamp of the key-down action is recorded.

In embodiments, the second device includes a virtual keyboard and the comparison which leads to the changing of functionality of the device, such as granting or denying of access to the one or more functions of the device is carried out using a key-down action determined by the steps of displaying or receiving an indication of the virtual keyboard being exhibited on a touchscreen of the second device; receiving data indicating motion input on the touchscreen, the data including a starting coordinate of the motion input, an ending coordinate of the motion input, and a timestamp of a key-up action; determining, based on the starting coordinate and the ending coordinate of the motion input, that a key of the virtual keyboard has been pressed; recording a timestamp of the motion input at the starting coordinate; and mapping the timestamp of the motion input at said starting coordinate to a key-down action for the key of the virtual keyboard.

In one embodiment, the second device includes a physical keyboard and the comparison leading to the changing of functionality of the device, such as granting or denying of access to the one or more functions of the device is carried out using a key-down action determined by the physical keyboard. This can include allowing access to secure data associated with a particular user to the exclusion of another user.

In certain embodiments, the disclosed method further includes the steps of recording the timestamp of the motion input at the starting coordinate; determining that the timestamp of the motion input at the starting coordinate in a storage device is a key-down action; receiving the timestamp of the corresponding key-up action provided by an operating system of the device; and comparing time between key-up and key-down actions on the device which executes the other disclosed steps using an operating system and a secure behavioral module to a previously-recorded timestamp of a previously-recorded key-down action and previously-recorded timestamp of a previously-recorded key-up action.

The present disclosed technology also discloses a method of determining an identity of a user of a device, based on the steps of displaying or receiving an indication of a display of a virtual keyboard on a touchscreen; receiving motion input data from the touchscreen including a starting coordinate and an ending coordinate of a motion therebetween; determining a time of a press of a key on the virtual keyboard displayed on the touchscreen, based on a start time of the motion input data and a determination that the start time corresponds to a key press of a key of said virtual keyboard; and changing of functionality of the device, such as granting or denying further access to one or more functions of the device based on the time of the press of the key, and comparisons of the time length to a previously determined time of a press of a second key on the virtual keyboard and/or a second keyboard.

In one embodiment, the motion input data is recorded continuously throughout said key press. In another embodiment, the motion input data further comprises, for every point touched on said touchscreen a set of x-y coordinates, a timestamp, a pressure reading, and accelerometer reading, and a gyroscope reading.

In some embodiments, the comparison which leads to the changing of functionality of the device, such as granting or denying of access to the one or more functions of the device includes determining that the key which was pressed and released is the same key as the second key. In other embodiments, the comparison which leads to the changing of functionality of the device, such as granting or denying of access to the one or more functions of the device includes comparing other information gathered by the device including pressure readings, accelerometer readings, and gyroscope readings.

In embodiments, the device includes an operating system kernel and a secure behavioral module, in which the motion input data is recorded and the time of the press of the key on the virtual keyboard displayed on the touchscreen is determined. In one embodiment, the comparisons of the time length to the previously determined time of the press of the key on the virtual keyboard and/or the second keyboard occur in the secure behavioral module. In another embodiment, the changing of functionality of the device, such as granting or denying of access to the one or more functions of the device based on the time of the press of the key is determined and executed from within the secure behavioral module.

In some embodiments, the second device includes an operating system kernel and a secure behavioral module in which the motion input data is recorded and in which the determining of the time of the press of the second key on the virtual keyboard displayed on the touchscreen occurs. In one embodiment, the data indicating the time of the press of the second key is recorded in the operating system kernel.

In embodiments, the method is carried out based on output of a virtual keyboard on the second device and virtual keyboard on the first device. In other embodiments, the method is carried out based on output of a physical keyboard of the second device and output of a virtual keyboard of the first device.

"Virtual" is defined as "lacking a physical structure of it's own but made by software to appear to be so", such as a virtual keyboard. "Virtual keyboard" is defined as a computer keyboard that a user operates by typing on, or touching on a touchscreen, or within a wireless—or optical-detectable surface or area rather than by depressing physical keys." "Coordinate" is defined as "a number, machine executable code, or each of a group of numbers, used to indicate the position of an action, point, line, or plane." "Input" is defined as "what is put in, taken in, or operated on by any process or system, such as the action or process of putting or feeding something into a system or the information fed into a computer or computer program." "Key" is defined as "each of several buttons on a panel, such as a virtual or physical keyboard, for operating a computer or system of which are used to enter data, input data, or operate on (data)." "Key-down action" is defined as the "the event or specific time point when a key, such as that of a virtual or physical keyboard, is depressed." "Key-up action" is defined as "the event or specific time point when a key, such as that of a virtual or physical keyboard, is released." "Key flight time" is defined as the duration between a key-up action and a key-down action." and pressing the next key "Timestamp" is defined as "a sequence of characters or encoded information identifying when a certain event has occurred, giving the date and/or the time of day."

"Mapping" is defined as "the process of recording distinct data points or inputs for the purpose of determining or establishing a relationship between the data points." "Pressure reading" is defined as "a data point or input expressing the measurement of pressure exerted on a particular object, such as a key." "Accelerometer reading" is defined as "a data point or input expressing the measurement of acceleration of an object, such as a keyboard, so as to determine the movement the object." "Touch sensor reading" is defined as "a data point or input expressing that an object has experienced physical touch, pressure, or force." "Gyroscope reading" is defined as "a data point or input expressing the orientation of an object, such as a keyboard." "Operating system kernel" is defined as a "computer program that is the core of a computer's operating system, with complete control over everything in the system. The operating system kernel includes a processor, a memory having non-transitory computer readable medium, or a logic, having a specific set of instructions that are executable by the processor.

A "module" is defined as each of a set of standardized parts or independent units that can be used to construct a more complex structure, such as component of a computer system. "Secure behavioral module" is defined as "a module which stores motion input data." "Anonymizing" is defined as "the process by which recorded, captured, or gathered data is sanitized, randomized, encrypted, or otherwise removing personally identifiable information from the data, so that the user to whom the data relates or describes remains anonymous", or "the process by which data is irreversibly altered in such a way that a data subject can no longer be identified directly or indirectly, either by the data controller alone or in collaboration with any other party." "Digitizer" is defined as "any device which receives analog information and creates a digital representation of it, or any device that puts data into digital form." A "key code" is defined as "a set of characters or a code, such as an ASCII code, which is associated with a particular key (or key plus a modifier) of a real or virtual keyboard."

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Figure 1:
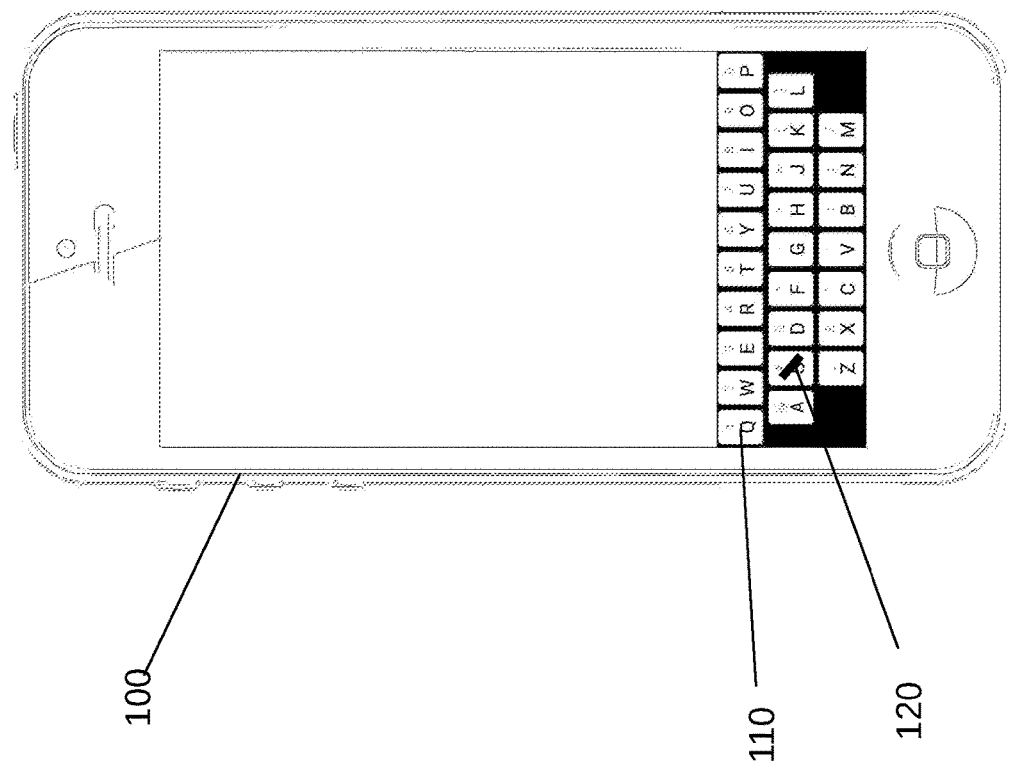
FIG. 1 shows a diagram of a trusted computing engine including a virtual keyboard in an embodiment of the disclosed technology.

The disclosed technology provides a method that captures and fuses touch/motion input data from multiple device-centric software sources, such that when the touch/motion input data is sent to a trusted computing engine, exact timestamps for when a touch screen is pressed and subsequently released can be derived. These exact timestamps provide the basis for deriving a timing of key, or button, presses that can be used for user authentication and/or classifying between authorized and unauthorized users. The derived key press timings form the basis for an improved behavioral classification system as well as forms the basis for a continuous authentication in a trusted computing engine that is running as a background process to an application layer. The touch/motion input data is funneled into the trusted computing engine from the device-centric software sources, where profiles for users are created, which include the touch/motion input data specific to a user. The profiles are securely stored in the trusted computing engine and can be made inaccessible to any software running on the device. The touch/motion input data can be encrypted at the capturing phase with a public key and later decrypted in the trusted computing engine with a secret key, such as a pin, password, or biometric identifier.

The method of the disclosed technology is to be performed in a trusted computing engine, e.g., an operating system kernel or the like, that can securely store and handle authentication information, on a device such as a smartphone. User touch and key press data, or motion data, are captured and sent to the operating system kernel when the user interacts with a device.

For entering text, applications in devices typically use external keyboard applications, or "soft keyboards". Such applications are separated from central functions of the device. One of these central functions is the method for reading out the digitizer for touch gesture data. The method of the disclosed technology stores a series of continuously touched screen data, or motion data, including x and y coordinates, pressure readings, area of touched screen, and timestamps with digitizer resolution, typically using a frequency of 120 Hz. Commonly, the soft keyboard cannot provide the timestamp of when a button is pressed ("key-down action"), only when it is released ("key-up action"), meaning there is no obvious way to determine the key-down action and key flight timings, i.e., when a user types on the soft keyboard. Thus, the disclosed method handles this problem by enriching the key press data with touch data for third party keyboard applications by replacing the soft keyboard with a keyboard application which explicitly queries the operating system kernel for exact key press timings.

In the method, once a key is pressed on the touchscreen of a device, the touch sensor begins sending input motion data to the operating system kernel of the device, handling touch capturing. The motion input data consists of or comprises x and y coordinates and timestamps, and in some embodiments, pressure and area readings. In conventional systems, the operating system kernel is initially not able to determine what kind of screen interaction the user is performing, as it can be any of a tap, swipe, scroll, flick etc. If the system is receiving input of a key character that has been depressed or typed, this information is handled and contained by the external soft keyboard application. The soft keyboard application only gets a limited set of data from the touch sensor of a device being used, namely what key was pressed and the timestamp of its key-up action, via a specific input connection method published to the soft keyboard application. As the key is later released, the timestamp is available in the soft keyboard application, but the soft keyboard application has no way of determining the timestamp of the key-down action, i.e., when the key was initially depressed, making it impossible for the input connection method to determine the key-down action and key flight times, i.e., duration between a key-up action and a key-down action, for a behaviometric user authentication.

Therefore, the method supplants the conventional soft keyboard input connection method with a version that allows retrieval of the key-down action data, which is matched to raw gesture data recorded by the touch sensor. From the touch or motion input data, the key-down action timestamp is calculated from the first of the raw data point timestamps, and thus a complete keystroke timing can be formed, for a key press and in some embodiments, each and every key press action the user generates on a particular device while embodiments of the disclosed technology are being carried out. This allows an accurate behavioral biometrics authentication in the operating system kernel, which is continuously running in the background for whatever application a user interacts with.

Embodiments of the disclosed technology will become clearer in view of the following description of the figures.

Figure 4:
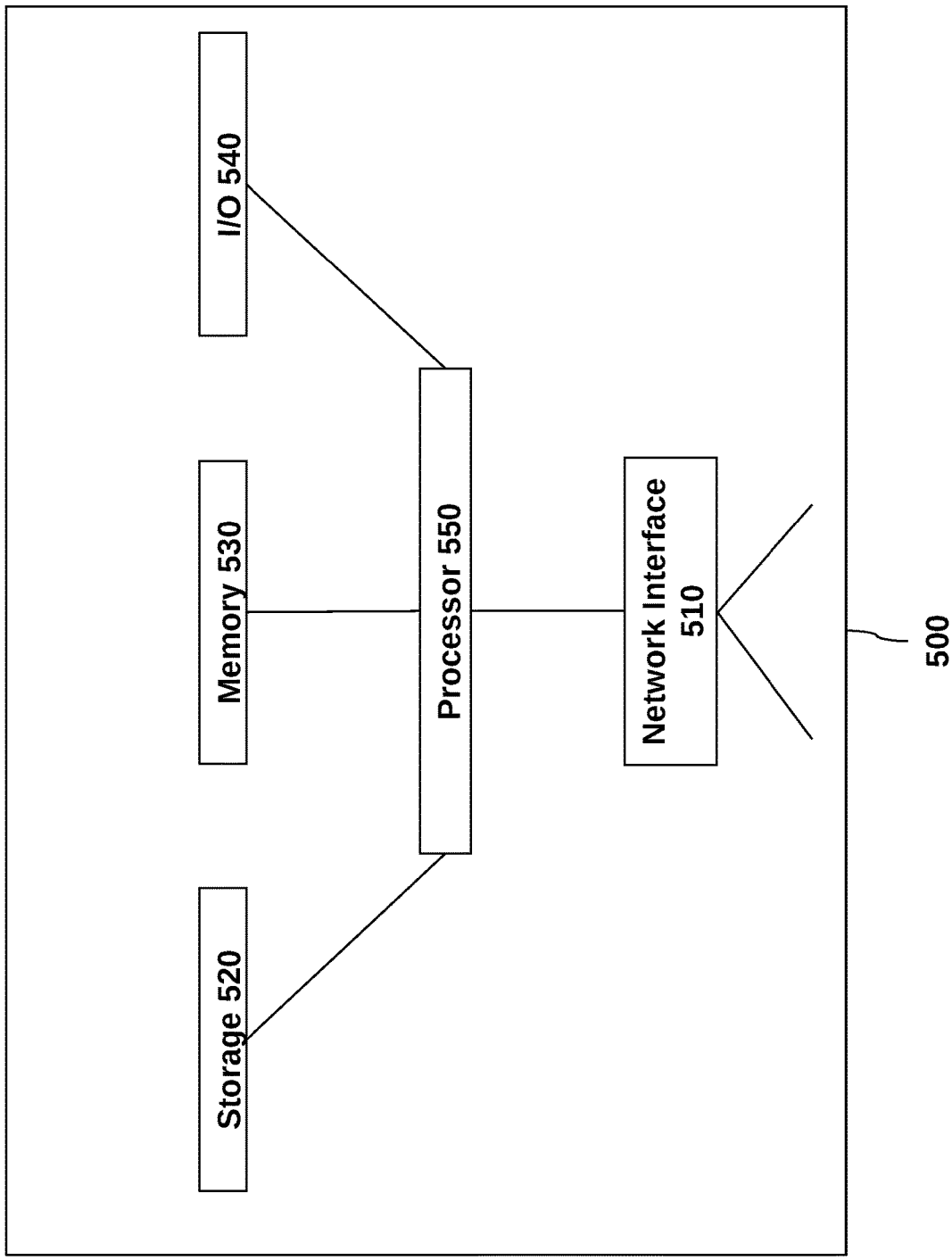
FIG. 4 shows a high level chart of devices used and is also a schematic view of the operating system kernel according to one embodiment of the disclosed technology.

Referring now to FIGS. 1 and 4, FIG. 1 shows a diagram of a trusted computing engine including a virtual keyboard in an embodiment of the disclosed technology. FIG. 4 shows a schematic view of the operating system kernel according to one embodiment of the present invention. The method of the disclosed technology is performed in, or utilizes, a trusted computing engine 100, e.g., a such as a smartphone, that includes an operating system kernel 500 and a virtual or physical keyboard 110. The method captures the position 120 of a user's swipe, depression, or the like and transfers that data to the operating system kernel 500 of the trusted computing engine 100. The operating system kernel 500 includes a network interface 510, a storage 520, a memory 530, and a processor 550, and is operable coupled to an input-output 540, or program, operation or device, that transfers data to or from a computer and to or from a peripheral device.

Figure 2:
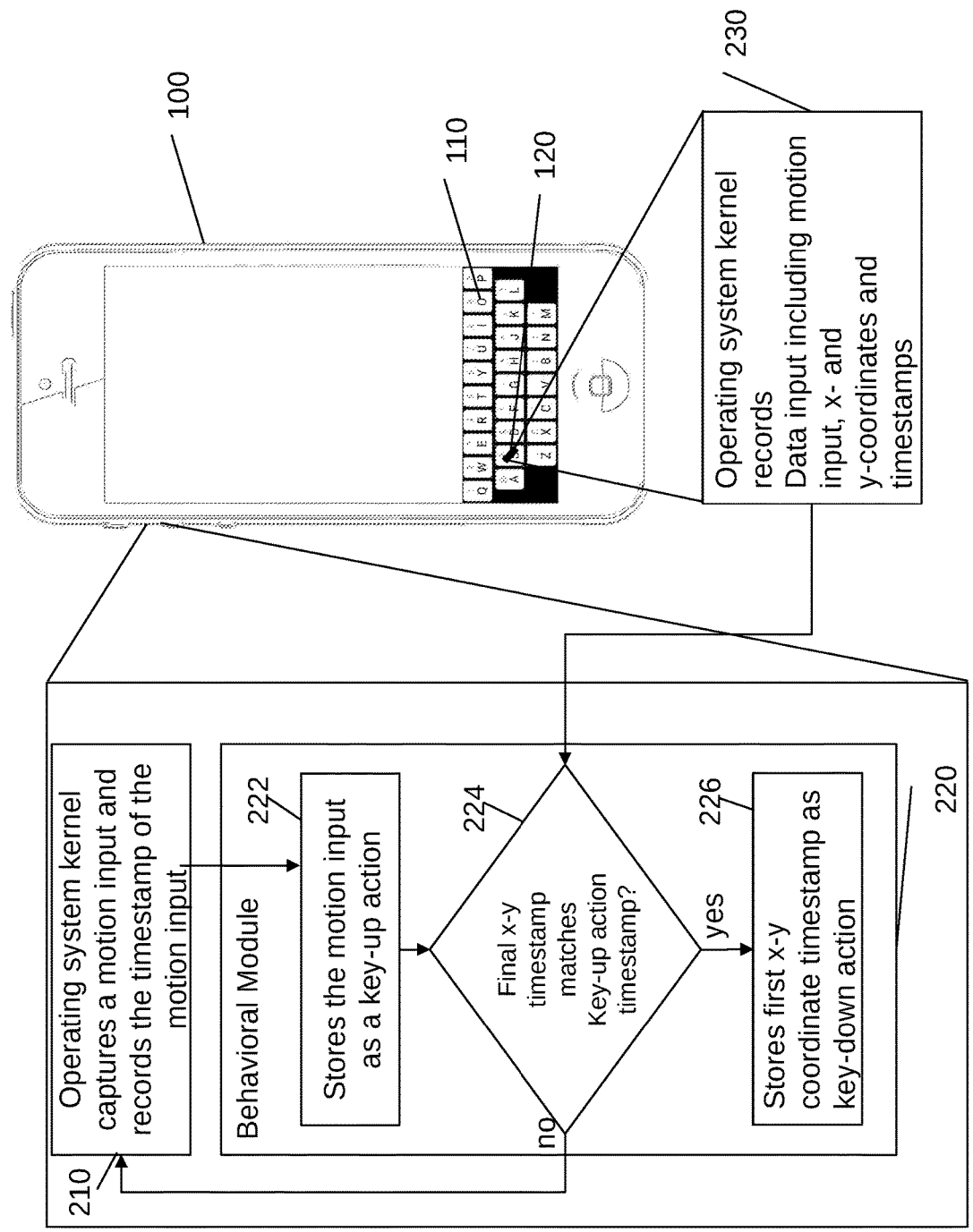
FIG. 2 shows a high-level diagram of the steps carried out by the method to record and map the motion input data according to one embodiment of the disclosed technology.
Figure 3:
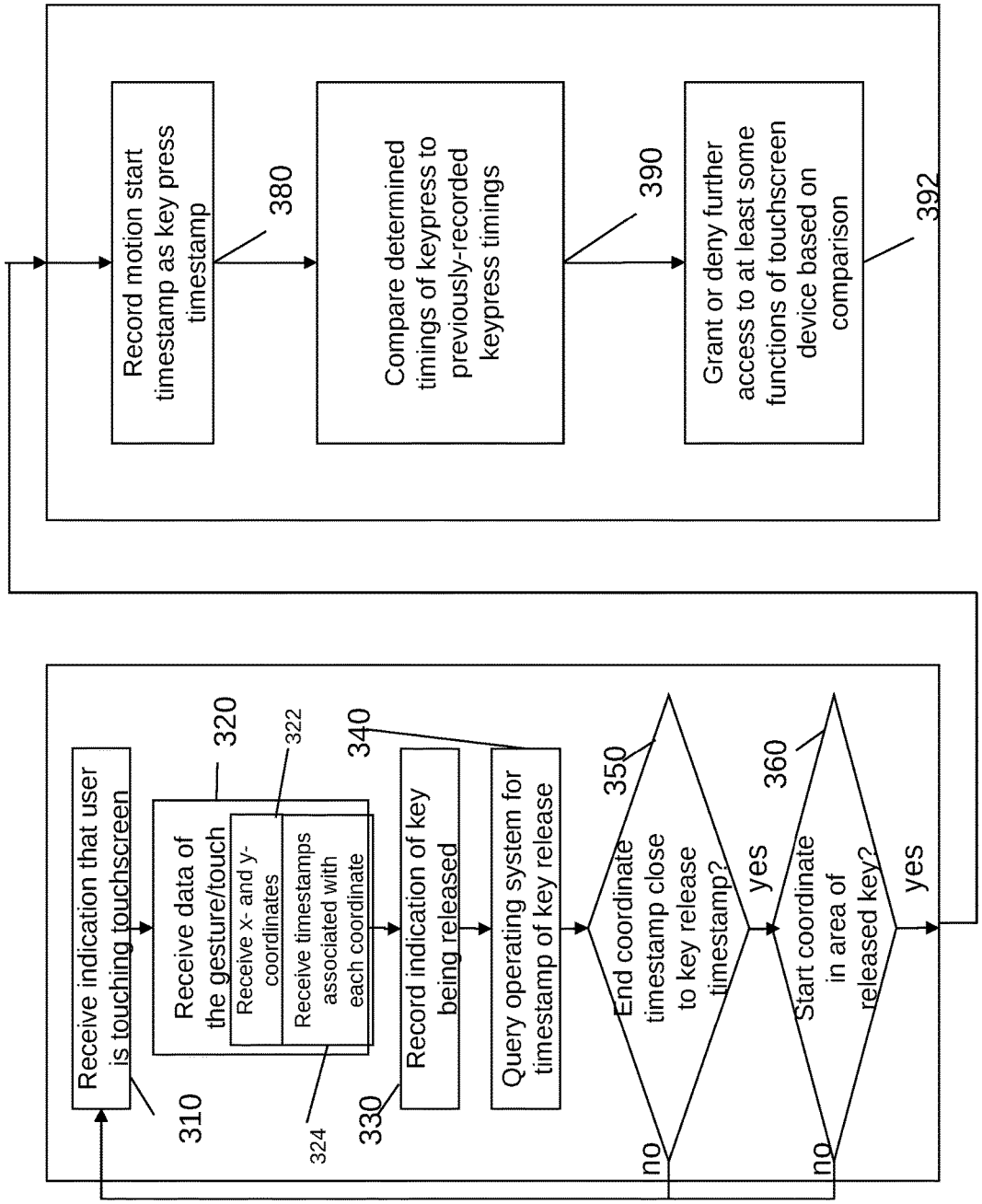
FIG. 3 shows a high-level diagram of the steps carried out by the method to compare the recorded and mapped motion input data and deny or grant user access based on the comparison according to one embodiment of the disclosed technology.

Referring now to FIGS. 2 and 3 simultaneously, FIG. 2 shows a high-level diagram of the steps carried out by the method to record and map the motion input data according to one embodiment of the disclosed technology. FIG. 3 shows a high-level diagram of the steps carried out by the method to compare the recorded and mapped motion input data and deny or grant user access based on the comparison according to one embodiment of the disclosed technology.

In embodiments, the method provides determining an identity of a user of the trusted computing engine by displaying or receiving an indication of a virtual keyboard being exhibited on a touchscreen 310 and receiving data input onto the touchscreen including motion input, a starting coordinate of the motion input, an ending coordinate of the motion input, and a timestamp of a key-up action 320, 322, 324. In some embodiments, the data input further includes pressure readings, accelerometer readings, touch sensor readings, and gyroscope readings of the device and key presses. In some embodiments, the method includes querying the operating system kernel for a timestamp of the motion input. In one embodiment, the method includes querying the timestamp of a key-up action 340.

The method further includes determining, based on the received starting coordinate and the received ending coordinate of the motion input, that a key of the virtual keyboard has been pressed 310, 330, recording a timestamp of the motion input at the starting coordinate 210, and mapping the timestamp of the motion input at the starting coordinate to a key-down action for the key press 230. In one embodiment, the data input, e.g., the motion input, the starting coordinate of the motion input, the ending coordinate of the motion input, and the timestamp of the key-up action, is recorded on the operating system kernel 222 and then transferred to a secure behavioral module 220. In some embodiments, the data input is anonymized before being transmitted to the secure behavioral module 220. In one embodiment, the anonymization is performed based on a compliance with a policy, or private policy decision, disposed on the secure behavioral module 220. In another embodiment, the mapping 230 occurs in the behavioral module 220.

The method further includes determining, based on a comparison between the timestamp of the key-up action and the timestamp of the key-down action 224, which key of the virtual keyboard the key press refers to, and changing of functionality of the device, such as granting or denying access to one or more functions of the device based on the timestamp of the key-down action for the key, a corresponding timestamp of the key-up action provided by the device, and comparisons of timing of the key-down action and the corresponding key-up action to a previously-recorded timestamp of a previously-recorded key-down action and a previously-recorded timestamp of a previously-recorded key-up action 392.

In one embodiment, if the key which was pressed and released in the key-down action and the corresponding key-up action is the same key as the key which was pressed and released in the previously-recorded key-down action and the previously-recorded key-up action then access is granted. In another embodiment, if the key which was pressed and released in the key-down action and the corresponding key-up action is the same key as the key which was pressed and released in the previously-recorded key-down action and the previously-recorded key-up action then access is denied. In one embodiment, this comparison step 390 as well as the changing of functionality of the device, step 392 occur on the secure behavioral module 220. In other embodiments, the comparison includes a comparison of pressure readings, accelerometer readings, touch sensor readings, and gyroscope readings of the device to previous recordings of pressure readings, accelerometer readings, touch sensor readings, and gyroscope readings on the device, or a second device.

In embodiments, the method further includes determining that the timestamp of the motion input at the starting coordinate is a key-down action 224, 226, receiving the timestamp of the corresponding key-up action provided by the operating system of the device 324, and comparing the time between a key-up action and a corresponding key-down action on the device to a previously-recorded timestamp of a previously-recorded key-down action and previously-recorded timestamp of a previously-recorded key-up action 390. The steps of the method are executed by the operating system kernel and the secure behavioral module.

In some embodiments, the previously recorded key-down action and the previously recorded key-up action timing data is obtained from a second device. The second device includes computing device, a keyboard, an operating system kernel, and a secure behavioral module. In one embodiment, the keyboard is a virtual keyboard. In another embodiment, the keyboard is a physical keyboard. In one embodiment, the timestamp of the key-up action is recorded on the operating system kernel of the second device and then transmitted to the secure behavioral module of the second device. In another embodiment, the timestamp of said key-down action is recorded on the operating system kernel. In yet another embodiment, the data input on the second device, including motion input, a starting coordinate of the motion input and the ending coordinate of the motion input is stored in the secure behavioral module of the second device. In an alternative embodiment, the mapping occurs on the secure behavioral module of the second device.

In some embodiments, the method further includes determining a key-down action by displaying or receiving an indication that the virtual keyboard is being exhibited on a touchscreen of the second device, receiving data input on the touchscreen, including motion input, a starting coordinate of the motion input, an ending coordinate of the motion input, and a timestamp of a key-up action, determining, based on the starting coordinate and the ending coordinate that a key of the virtual keyboard has been pressed, recording a timestamp of the motion input at the starting coordinate; and mapping the timestamp of the motion input at the starting coordinate to a key-down action for the key.

In embodiments of the present disclosed technology, the method provides a method of determining an identity of a user including displaying or receiving an indication of a display of a virtual keyboard on a touchscreen, and receiving motion input data from the touchscreen including a starting coordinate and an ending coordinate of a motion between the starting coordinate and the ending coordinate. In one embodiment, the motion input data is recorded continuously throughout a key press or series of key presses. In another embodiment, the motion input data further includes, for every point (pixel) touched on the touchscreen, a set of x-y coordinates, a timestamp, a pressure reading, accelerometer reading, and a gyroscope reading. In some embodiments, the method includes querying the operating system kernel for a timestamp of the motion input and the key-up action 340. If the end coordinate timestamp is close to the key-up timestamp 350 and if the start coordinate of the motion input is in the area of the key-up action 360, or released key, the operating system kernel records the motion input timestamp as the key-down timestamp 380.

The method further includes determining a time of a press of a key on the virtual keyboard displayed, based on a start time of the motion input data and a determination that the start time corresponds to a key press of a key of said virtual keyboard, and changing of functionality of the device, such as granting or denying further access to one or more functions of the device 392 based on the time of the press of the key, and comparisons of the time length to a previously determined time of a press of a second key on the virtual keyboard and/or a second keyboard 390. In one embodiment, further access is granted if in the comparison step it is determining that said key which was pressed and released is the same key as the second key. In another embodiment, further access is denied if in the comparison step it is determining that said key which was pressed and released is the same key as the second key. In other embodiments, the comparison includes a comparison of pressure readings, accelerometer readings, touch sensor readings, and gyroscope readings of the device to previous recordings of pressure readings, accelerometer readings, touch sensor readings, and gyroscope readings on the device, or a second device.

In embodiments, the device of the method includes an operating system kernel and a secure behavioral module, in which the motion input data is recorded and the time of the press of the key on the virtual keyboard displayed on the touchscreen is determined. In one embodiment, the comparisons of the time length to the previously determined time of the press of the key on the virtual keyboard and/or the second keyboard occur in the secure behavioral module. In another embodiment, the changing of functionality of the device, such as granting or denying of access to the one or more functions of the device based on the time of the press of the key is determined and executed from within the secure behavioral module.

In some embodiments, the motion input data is recorded on the secure behavioral module. In one embodiment, the determining of the time of the press of the second key on the virtual keyboard displayed on the touchscreen occurs on the secure behavioral module. In one embodiment, the data indicating the time of the press of the second key is recorded in the operating system kernel.

In embodiments, the method is carried out based on output of a virtual keyboard on the second device and virtual keyboard on the first device. In other embodiments, the method is carried out based on output of a physical keyboard of the second device and output of a virtual keyboard of the first device.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A method of determining a timestamp of a keydown action of a touchscreen of a device, based on the following steps, in order:

receiving, from said device, a first timestamp of a key-up action of a particular key displayed on said touchscreen at first location coordinates;

retrieving time and coordinate data comprising at least pairs of location coordinates and associated timestamps of previously-recorded touch sensor readings on said touchscreen from said device, wherein said previously recorded touch sensor readings are from a time before said first timestamp;

retroactively determining that a second timestamp of a key-down action of said particular key corresponding to said key-up action has not been received from said device;

comparing first location coordinates of said particular key displayed on said touchscreen with said retrieved time and coordinate data of said previously recorded touch sensor readings on said touchscreen;

based on said comparing, obtaining from said previously-recorded touch sensor readings a third timestamp associated with second location coordinates of a first touch on said touchscreen, wherein said third timestamp is proximate to said first timestamp and said second location coordinates match said first location coordinates of said particular key;

using said third timestamp to obtain said second timestamp of said particular key; and comparing said second timestamp and said first timestamp of said particular key with other inputs obtained from said device or another device;

wherein said other inputs comprise timestamps of key-up and key-down actions of said particular key obtained from said device or said another device; and wherein said another device comprises a device which has non-touchscreen or touchscreen inputs.

* * * * *